No. 647,721. Patented Apr. 17, 1900.
E. N. HIGLEY.
VENTILATING WIND WHEEL FOR COWLS.
(Application filed May 20, 1897.)
(No Model.) 2 Sheets—Sheet 1.
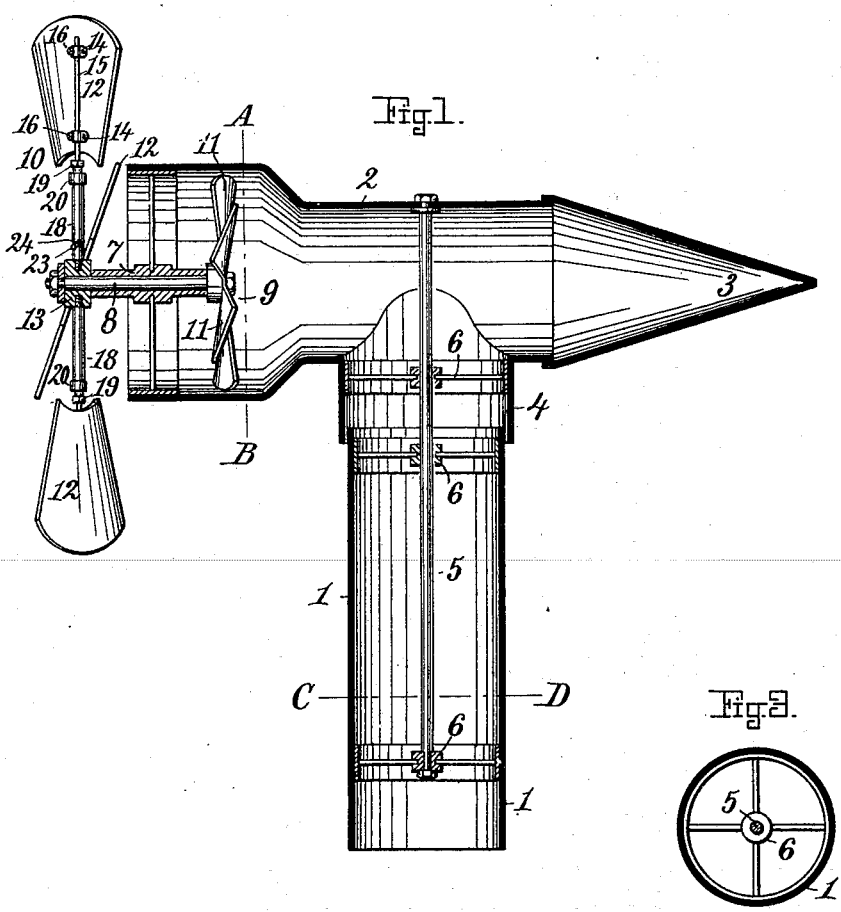
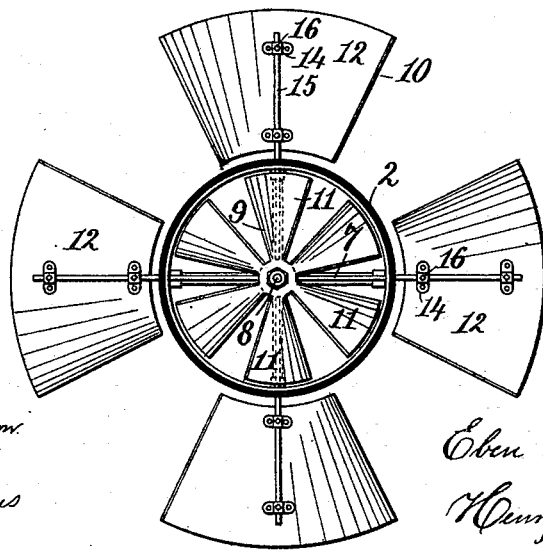
Witnesses
S. Bayard Thompson
Harry N. Squires
Inventor
Eben N. Higley
by
Henry Chadbourn
his atty.

No. 647,721. Patented Apr. 17, 1900.
E. N. HIGLEY.
VENTILATING WIND WHEEL FOR COWLS.
(Application filed May 20, 1897.)
(No Model.) 2 Sheets—Sheet 2.
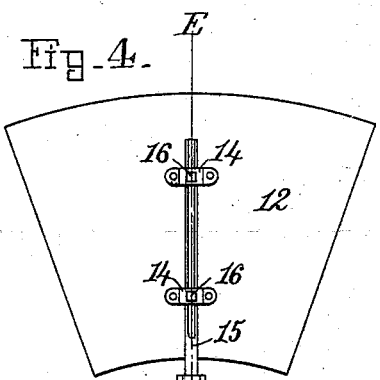
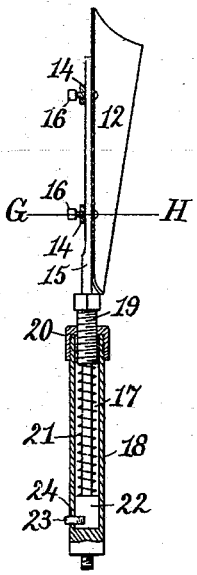
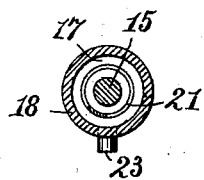
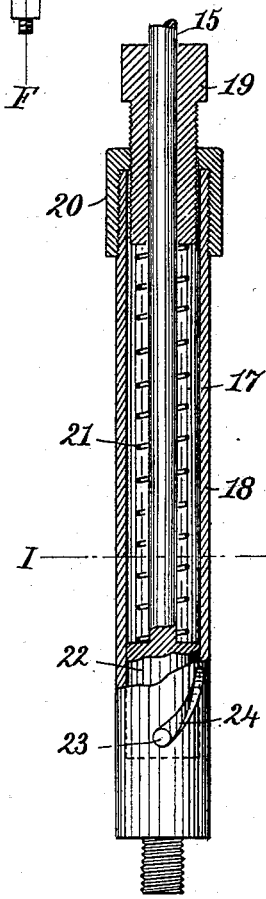
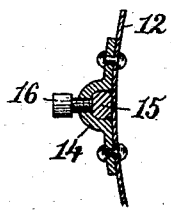
Witnesses
Harry N. Lewis
L. Bayard Thompson
Inventor
Eben N. Higley
by Henry Chadbourn
his Atty.

UNITED STATES PATENT OFFICE.

EBEN N. HIGLEY, OF SOMERSWORTH, NEW HAMPSHIRE.

VENTILATING WIND-WHEEL FOR COWLS.

SPECIFICATION forming part of Letters Patent No. 647,721, dated April 17, 1900.

Application filed May 20, 1897. Serial No. 637,312. (No model.)

*To all whom it may concern:*

Be it known that I, EBEN N. HIGLEY, of Somersworth, in the county of Strafford and State of New Hampshire, have invented certain new and useful Improvements in Ventilating Wind-Wheels for Cowls, of which the following, taken in connection with the accompanying drawings, is a specification.

This invention relates to improvements in wind-wheels, and more especially to those used in connection with an internal fan in a vetilator to ventilate chimneys, stacks of pipe, bath-rooms, stables, &c., and has for its object to prevent injury to the wheel or the internal fan when the wind is very strong and to cause a more even draft by the ventilator, and, further, to provide easy means whereby the ventilator can be changed so as to exhaust air from the space to be ventilated or to force air into said space.

The invention consists of the combination of elements and the arrangement and construction of parts, as will be fully described hereinafter, and it is carried out substantially as illustrated on the accompanying drawings, whereon—

Figure 1 represents a vertical longitudinal section of a ventilator embodying my invention. Fig. 2 represents a vertical cross-section of the same on the line A B, shown in Fig. 1. Fig. 3 represents a horizontal cross-section on the line C D, also shown on Fig. 1. Fig. 4 represents a detail front elevation of one of the arms of a wind-wheel used in my invention, the purpose and operation of which wind-wheel will be fully understood by a further description of the invention. Fig. 5 represents a longitudinal section of the arms of the wind-wheel on the line E F, shown in Fig. 7. Fig. 6 represents an enlarged detail view of a portion of one of the arms of the wind-wheel, showing the same partially in longitudinal section. Fig. 7 represents an enlarged detail section on the line G H, shown in Fig. 8. Fig. 8 represents a cross-section of one of the arms of the wind-wheel on the line I J, shown in Fig. 9.

Like characters of reference refer to like parts wherever they occur in the different parts of the drawings.

The ventilator which has been shown to illustrate my invention is provided with a casing which is made in two parts 1 and 2. The lower vertical portion 1 of the casing is preferably made in the form of a cylindrical tube, as shown, which is connected to and in open communication with the stack of pipes or the space or chamber to be ventilated. The upper portion 2 of the casing is made in the form of a cylindrical tube and arranged horizontally, it being closed at one end by a conical portion 3, but is open at the opposite ends, as is shown in Fig. 1. The casing 2 has a branch 4, which extends downward, and surrounding the upper open end of the casing 1 forms an open communication between the portions 1 and 2 of the casing. A vertical shaft 5 is located within the casing and is mounted within bearings in spider-shaped brackets 6 6, substantially as shown and in such a manner that the portion 2 of the casing is free to rotate upon the portion 1 of the casing with the shaft 5 as a fulcrum, so as to present the open mouth of the casing 2 in any direction in relation to the casing 1 for a purpose to be fully understood from a further description of the operation of the ventilator.

Within a bearing in a spider-shaped bracket 7, located within the open mouth of the casing 2, is mounted the shaft 8, which is free to rotate within said bearing. Upon the shaft 8 are firmly attached the internal fan 9 and the external fan or wind-wheel 10. The internal fan 9 preferably is of such a diameter as to nearly equal the diameter of the casing 2, while the external fan or wind-wheel 10 has a diameter greatly in excess of the diameter of the casing 2 and sufficient to extend considerably on either side of the casing. The blades 11 of the fan 9 extend from the center of the fan to the extreme outer periphery of the same, and said blades are rigidly attached to said fan. The blades 12 of the fan 10 extend from the outer periphery of the fan toward the center thereof a sufficient distance so as not to extend beyond the surface of the casing 2 and therefore not to obstruct the open mouth of said casing.

The arms which carry the blades 12 of the wind-wheel are secured to and extend radially from the hub 13, attached in any suitable manner to the shaft 8.

The blades of the wind-wheel are provided with the blocks 14 14, through which the outer portion 15 of the arm of the fan is inserted and within which said portion is held by means of the screws 16 16. By means of this construction it will be understood that the relative position or incline of the blade may be changed, so as to make it feather more or less, as desired.

The outer portion 15 of the arm of the fan is loosely mounted within the recess 17 in the inner portion 18 of said arm. An externally-screw-threaded sleeve 19 surrounds the outer portion 15 of the arm of the fan and is screwed through a screw-threaded perforation in the cap 20, which cap is secured to the outer end of the portion 18 of the arm of the fan.

A spiral spring 21 within the recess 17 surrounds the portion 15 between the sleeve 19 and the enlarged end 22 of the portion 15, which spring tends to force the portion 15 inward toward the center of the fan. The enlarged end 22 of the portion 15 is provided with a pin or stud 23, which projects through a short spiral slot 24 in the portion 18.

The action of the arm, as above described, is such that when the speed of the fan is increased by an increase in the velocity of the wind the centrifugal action on the blade 12, attached to said arm, will tend to cause said blade to move outward from the center of the fan and thereby will draw the portion 15 outward from the recess in the portion 18 against the influence of the spring 21. As the portion 15 moves outward the combined action of the pin 23 and slot 24 will cause the portion 15, with its attached blade 12, to turn. This turning of the blade 12 will feather the blade more or less, or, in other words, will gradually decrease the amount of its surface which will be exposed to the action of the wind until only the edge of the blade is acted upon by the wind. This will act to reduce the power exerted by said blade upon the fan and the fan-shaft, and consequently reduce the speed of the fan until there is an equilibrium between the centrifugal action on the blade and the action of the spring 21 upon the blade. Thus it will be seen that this construction acts as a governor to practically maintain a uniform speed of the fan independent of the velocity of the wind. It will also be seen that the amount of the speed of the fan necessary to cause the blades to turn in a manner as above described depends upon the power of the spring 21, and as the power of this spring may be increased or diminished by the adjustment of the sleeve 19 within the cap 20 this uniform speed of the fan may be increased or diminished, as desired, by the adjustment of said sleeve. Thus I not only provide a governor for said fan, but also make said governor adjustable, as desired.

It has been found that in some cases an internal fan with a diameter equal to the diameter of the space through which the air is to be drawn by said fan is not sufficiently powerful to produce the desired result, and to overcome this difficulty I increase the diameter of the open mouth of the casing 2 and that portion of said casing in which the internal fan 9 is located and increase the diameter of the internal fan in the same manner.

By pivotally mounting the casing 2 upon the casing 1 and using the external fan 10 the casing 2 will be turned upon its fulcrum so that its open mouth will be in a direction directly opposite to that from which the wind is blowing. This causes the ventilator to answer the purpose of a weather-vane as well as that of a ventilator, and it also prevents any snow, sleet, or rain from entering the ventilator.

In some cases it is desirable that air should be forced downward through the casings 1 and 2, and in such a case it is only necessary that the inclines of the blades 12 on the fan 10 should be changed, so as to be opposite from that showing on the drawings, in which case the fan 10 will be rotated so as to draw air from outside and force it down the casing 1.

In order to make the ventilator very sensitive and to cause it to operate when there is but a slight stir in the air, I prefer to provide the bearings for the fan-shaft, as well as those for the vertical shaft, with ball-bearings; but it has been deemed unnecessary to illustrate such, as their construction is too well known to need illustration or explanation.

Having thus fully described the nature, construction, and operation of my invention, without attempting to illustrate or describe all of the various forms and devices which may be used to carry it out, I wish to secure by Letters Patent and claim—

1. In a ventilator, a casing, an internal fan within the casing, a shaft carrying said fan, an external fan on said shaft to rotate said internal fan, said external fan consisting of a plurality of radiating arms each made in two parts the outer part movable longitudinally in relation to the inner part, a spring tending to normally draw the outer part toward the center of the fan, a cam-slot on one of the parts of the arm, a pin on the other part of the arm engaging the cam-slot, and blades carried by the outer parts of said arms, whereby the outer parts of the arms of the external fan will move outward as the velocity of the rotations of the fan increases, and the blades of the fan will be feathered more or less thereby, to maintain a more uniform speed of the internal fan, for the purpose set forth.

2. In a ventilator, a casing, an internal fan within the casing, a shaft carrying said fan, and an external wind-wheel on said shaft to rotate said fan, said wheel having radiating supporting-arms, and blades adjustably mounted upon said arms, each blade constructed so as to be turned upon its supporting-arm as an axis to vary the incline of each blade independent of the others and whereby the direction of the rotations of the internal fan may be changed as desired to cause air to be drawn from the space to be ventilated or air to be forced into said space, for the purpose set forth.

In testimony whereof I have signed my name to this specification, in the presence of two subscribing witnesses, on this 18th day of May, A. D. 1897.

EBEN N. HIGLEY.

Witnesses:
  HENRY CHADBOURN,
  HARRY N. SQUIRES.